No. 667,891. Patented Feb. 12, 1901.
G. NEUDECKER.
LIQUOR MIXER AND DISPENSER.
(Application filed June 28, 1900.)
(No Model.)
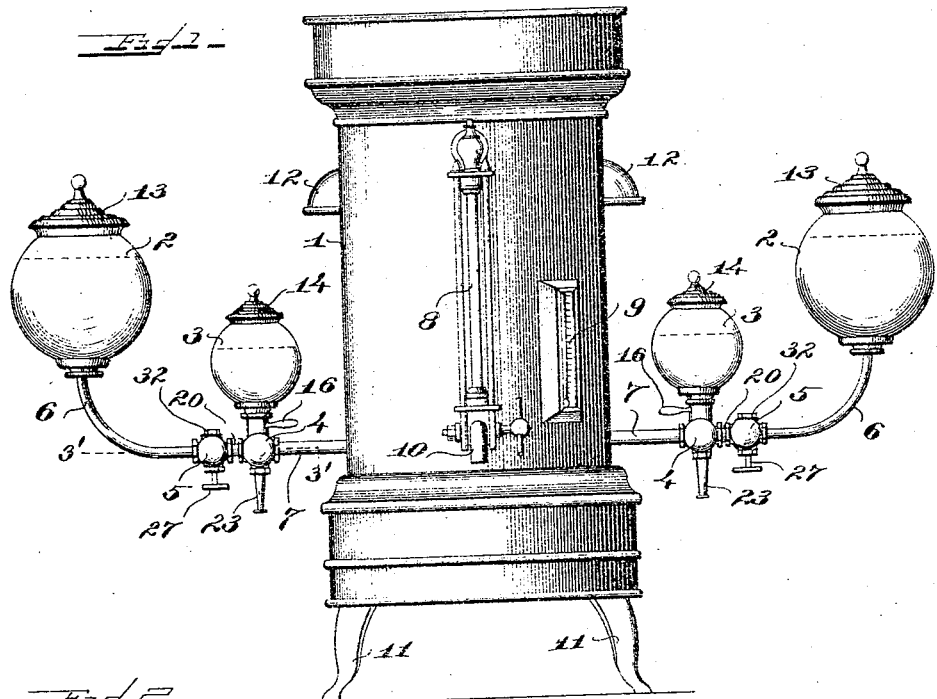
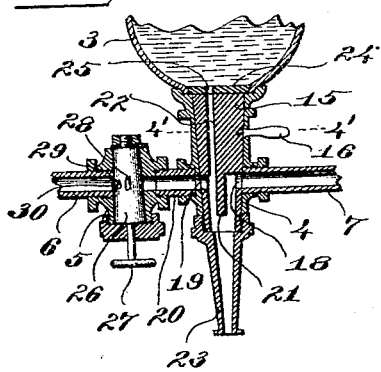
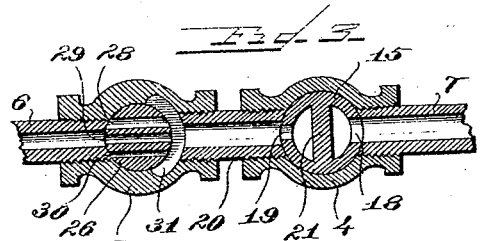
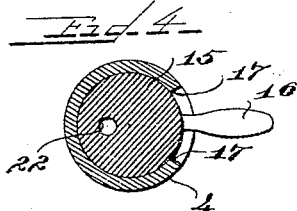
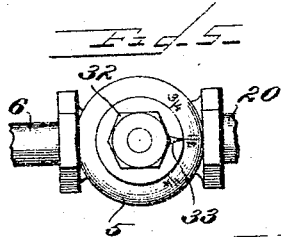
Witnesses
G. A. Tauberschmidt
Glen C. Stephens.
Inventor
Gottlieb Neudecker,
By Wm. R. Rummler,
his Atty.

UNITED STATES PATENT OFFICE.

GOTTLIEB NEUDECKER, OF CHICAGO, ILLINOIS.

LIQUOR MIXER AND DISPENSER.

SPECIFICATION forming part of Letters Patent No. 667,891, dated February 12, 1901.

Application filed June 28, 1900. Serial No. 21,866. (No model.)

*To all whom it may concern:*

Be it known that I, GOTTLIEB NEUDECKER, a citizen of the United States of America, and a resident of Chicago, in the county of Cook and State of Illinois, have invented certain new and useful Improvements in Liquor Mixers and Dispensers, of which the following is a specification.

The main objects of my invention are, first, to provide an improved device for containing hot water and other liquors in separate compartments and adapted to mix same in the act of drawing through a common faucet; second, to provide for regulating in suitable proportion the flow of the liquids to be drawn, and, third, to provide for drawing and mixing a syrup with the other liquids through the same faucet.

The particular objects of the different parts with which I put my invention into practice will be understood from the following description, with reference to the accompanying drawings, in which—

Figure 1 is a front elevation of the device constructed according to my invention. Fig. 2 is a vertical section of one of the faucets with the adjoining regulating-valve, with the connecting-pipes and receptacle partly broken away. Fig. 3 is a horizontal section on the line 3' 3' of Fig. 1. Fig. 4 is a horizontal section on the line 4' 4' of Fig. 2. Fig. 5 is a top plan of the regulating-valve.

The device shown consists mainly of the receptacle 1 for containing water, the transparent receptacles 2 for containing liquors of different kinds, the transparent receptacles 3 for containing the syrups, the faucet 4, regulating-valves 5, and the connecting-pipes 6 and 7.

The receptacle 1 is made of common form, being provided with a gage 8, a thermometer 9, and the faucet 10 for drawing water directly from said receptacle. The body of the receptacle is supported on legs 11, which raise same a suitable height for placing a heating apparatus under said body. The device is provided with handles 12 for lifting same.

The receptacles 2 and 3, which are preferably made of glass, are provided with removable covers 13 and 14. The object of making these receptacles of glass is to permit the consumer to see the liquor contained in same.

The faucet 4 consists of an outer casing having therein a turn-plug 15, provided with a handle 16, which projects through the slot 17 in said casing. The plug 15 has the ports 18 and 19 for communicating with the pipes 7 and 20, respectively. Said plug is provided with a partition 21, extending down between the ports 18 and 19 and designed to prevent the greater force of the liquid through the port 18 from interfering with the free flow of the liquid through the port 19. The plug 15 is also provided with a vertical passage 22 for carrying the liquid from the receptacle 3 into the lower hollow part of the plug 15 and through the spout 23. The passage 22 will be made of the proper size to permit a flow of the syrup in the desired proportion to the flow of water permitted by the size of the port 18. The receptacle 3 is cemented to the casing of the faucet 4. The plate 24 is secured in the lower part of the receptacle 3 and has a perforation 25, adapted to register with the passage 22 when the handle 16 is in a fixed position and when the ports 18 and 19 register with the pipes 7 and 20, respectively.

The regulating-valve 5 consists of an outer casing having a turn-plug 26 therein, provided with a handle 27. The plug 26 has ports 28, 29, and 30 extending through same. Said ports are adapted to form a connection between the pipes 6 and 20 and are of different sizes for regulating the quantity of liquid which will pass through said plug. In Fig. 2 the plug 26 is turned so as to show the side of same which is presented toward the right of Fig. 3. The valve-casing 5 has a chamber 31 therein toward the pipe 20 of sufficient width to permit communication through either of the ports 28, 29, and 30 when such port registers with the pipe 6. The nut 32 is threaded to the upper part of the plug 26 and turns with said plug. Said nut is provided with a pointer 33 for denoting the proportion of liquor from the receptacle 2 to be mixed with the water coming from the receptacle 1. The pointer is shown in Fig. 5 as opposite the mark "½" on the casing 5. This denotes that the quantity of liquor flowing from the receptacle 2 will be one-half of the quantity flowing from the receptacle 1. The other marks on the casing 5 indicate different proportions.

The operation of my device is as follows:

The water in the receptacle 1 will be kept at the desired temperature by means of any suitable heater. The operator will set the plug 26 to permit the flow of the desired proportion of liquor from the receptacle 2. The handle 16 will be normally in a position either forward or back of that shown in the drawings, so that the ports 18 and 19 will be closed, not registering with the pipes 7 and 20, respectively. In this position the passage 22 will also be out of alinement with the perforation 25. To draw the mixed liquids, the operator will turn the handle 16 to the position shown in the drawings, when water will be drawn from the port 18, syrup through the passage 25, and liquor from the receptacle 2 through the pipe 6, valve 5, and pipe 20. It will be seen that the construction of the faucet 4 is such that a single movement of the handle 16 will simultaneously open or close the ports 18 and 19 and the passage 22. Thus when the connecting-valve 5 is once adjusted the operator may as frequently as desired draw quantities of the mixed liquids containing the same ingredients in the same proportions.

It will be understood that various details of the construction shown may be altered without departing from the spirit of my invention. I therefore do not confine myself to such details, except as hereinafter limited in the claims.

What I claim as my invention, and desire to secure by Letters Patent, is—

1. A liquor mixer and dispenser comprising a main receptacle, and two or more auxiliary receptacles for containing different liquids, one of said auxiliary receptacles being transparent, a faucet having independent communication with each of said receptacles, and having a valve therein adapted by a single movement of same to simultaneously draw liquids from each of said receptacles, and a regulating-valve independent of the valve in said faucet and adapted for controlling the relative proportion of the liquids flowing from the main receptacle and the transparent receptacle, substantially as described.

2. A liquor mixer and dispenser comprising a main receptacle suitable for containing water to be heated therein a transparent receptacle suitable for containing another liquid, a faucet having independent communication with the lower part of each of said receptacles; said faucet comprising a casing, a turn-plug therein having a lower chamber, said casing having ports for said independent communication, said plug having ports registering with the ports in the casing and having a partition 21, between said ports, substantially as described.

3. A liquor mixer and dispenser comprising a main receptacle suitable for containing water to be heated therein a transparent receptacle suitable for containing another liquid, a faucet having independent communication with the lower part of each of said receptacles; said faucet comprising a casing, a turn-plug therein having a lower chamber, said casing having ports for said independent communication, said plug having ports registering with the ports in the casing and having a partition 21, between said ports, and a passage 22 independent of said ports; and a third receptacle communicating with the passage 22, substantially as described.

Signed at Chicago, Illinois, this 25th day of June, 1900.

GOTTLIEB NEUDECKER.

Witnesses:
WM. R. RUMMLER,
ROBERT W. MCCULLOCH.